Sept. 4, 1951    J. BELADA    2,567,094
MACHINE FOR ASSEMBLING CAPS AND LINERS
Filed Feb. 16, 1946    12 Sheets-Sheet 1

Inventor
JOHN BELADA

Sept. 4, 1951 J. BELADA 2,567,094
MACHINE FOR ASSEMBLING CAPS AND LINERS
Filed Feb. 16, 1946 12 Sheets-Sheet 2

Fig. 3.

Inventor
JOHN BELADA

By Rule & Hoge
Attorneys

Sept. 4, 1951 J. BELADA 2,567,094
MACHINE FOR ASSEMBLING CAPS AND LINERS
Filed Feb. 16, 1946 12 Sheets-Sheet 4

Inventor
JOHN BELADA

By Rule & Hoge
Attorneys

Sept. 4, 1951  J. BELADA  2,567,094
MACHINE FOR ASSEMBLING CAPS AND LINERS
Filed Feb. 16, 1946  12 Sheets-Sheet 5

Inventor
JOHN BELADA
By Rule & Hoge
Attorneys

Sept. 4, 1951 J. BELADA 2,567,094
MACHINE FOR ASSEMBLING CAPS AND LINERS
Filed Feb. 16, 1946 12 Sheets-Sheet 6

Inventor
JOHN BELADA
By Rule & Hoge
Attorneys

Sept. 4, 1951             J. BELADA             2,567,094

MACHINE FOR ASSEMBLING CAPS AND LINERS

Filed Feb. 16, 1946             12 Sheets-Sheet 7

Inventor
JOHN BELADA

By Rule & Hoge,
Attorneys

Inventor
JOHN BELADA

Sept. 4, 1951 J. BELADA 2,567,094
MACHINE FOR ASSEMBLING CAPS AND LINERS
Filed Feb. 16, 1946 12 Sheets-Sheet 9

Inventor
JOHN BELADA
By Rule & Hoge,
Attorneys

Sept. 4, 1951                J. BELADA                    2,567,094
                MACHINE FOR ASSEMBLING CAPS AND LINERS
Filed Feb. 16, 1946                              12 Sheets-Sheet 11

Inventor
JOHN BELADA
By Rule and Hoge
Attorneys

Sept. 4, 1951  J. BELADA  2,567,094
MACHINE FOR ASSEMBLING CAPS AND LINERS
Filed Feb. 16, 1946  12 Sheets-Sheet 12

Inventor
JOHN BELADA

Patented Sept. 4, 1951

2,567,094

UNITED STATES PATENT OFFICE 2,567,094

MACHINE FOR ASSEMBLING CAPS AND LINERS

John Belada, Glassboro, N. J., assignor to Owens-Illinois Glass Company, a corporation of Ohio Application February 16, 1946, Serial No. 648,053

3 Claims. (Cl. 113—80)

My invention relates to apparatus for assembling caps or closure devices such as used for bottles, jars and the like, with ring gaskets or liners. The invention provides automatic apparatus for assembling flanged caps and ring gaskets or liners made of rubber or the like, the liner being inserted within the flanged cap and secured therein by upsetting the edge of the flange and causing it to grip the liner.

An object of the invention is to provide apparatus by which the caps and ring gaskets supplied from separate sources can be fed to an assembling apparatus by which the gaskets are inserted within the caps, then transferred to spinning mechanism by which the gaskets are secured in the caps, the operations being entirely automatic and performed with great rapidity.

Other objects of the invention will appear hereinafter.

Referring to the accompanying drawings which illustrate assembling apparatus embodying my invention.

Figures 1, 2:
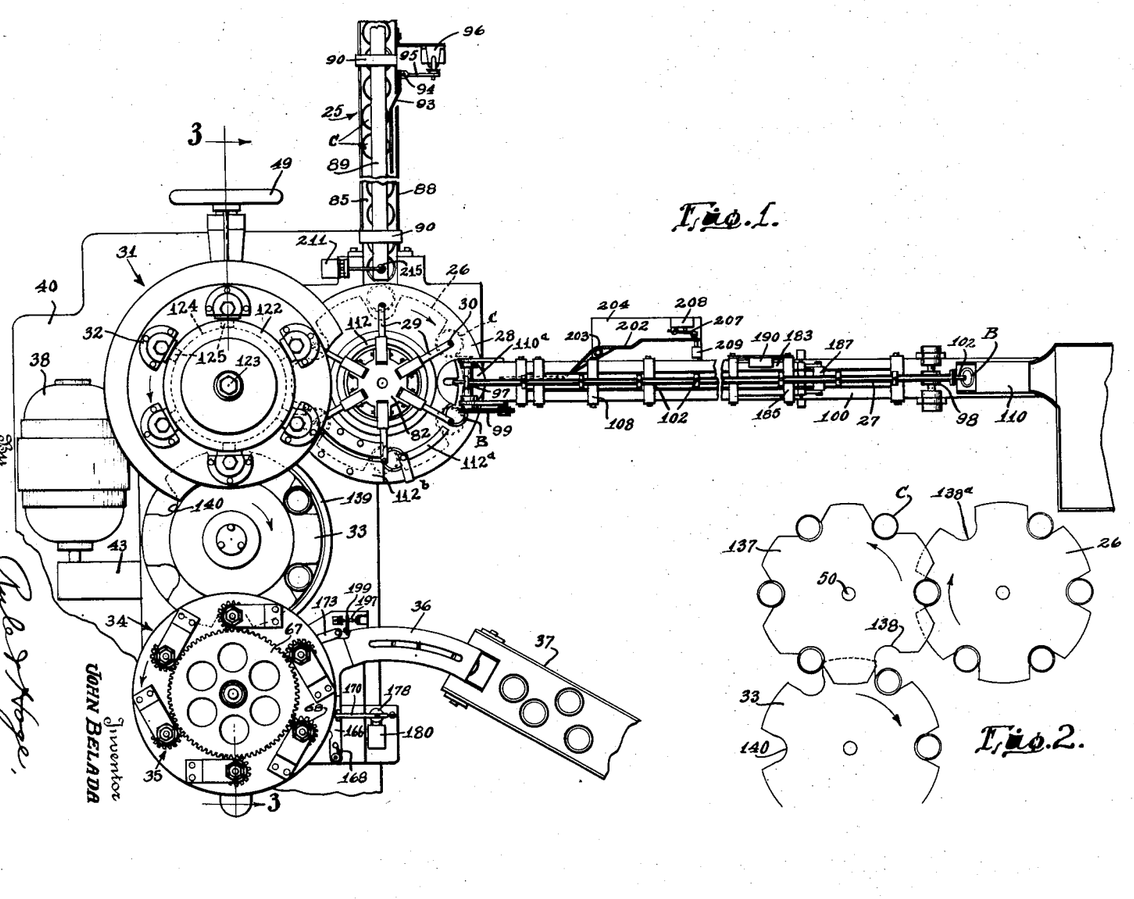
Fig. 1 is a plan view of the apparatus, parts being broken away.
Fig. 2 is a plan view of a train of transfer disks.

Referring to Fig. 1, the apparatus comprises, in general terms, a cap conveyor 25 by which the caps C are conveyed to a rotary transfer disk 26; a ring conveyor 27 by which ring gaskets or liners B are conveyed to and deposited on a stationary annular platform 28 overlying the disk 26; radially disposed transfer arms 29 which rotate over the face of the platform 28 and each provided at its outer end with a lug 30 to engage the rings B; an assembly device 31 rotatable about a vertical axis and carrying assembly units 32 to receive the caps and rings, the assembly units including means to insert the rings within the caps and secure them therein; a transfer disk 33 which receives the cap and ring assemblies and transfers them to a spinning device 34, the latter comprising six spinning heads or units 35 arranged in an annular series and by which the free edges of the cap flanges are spun over the upper margins of the rings and the latter thereby securely gripped and held in position within the caps; and a discharge chute 36 through which the completed caps are discharged to a conveyor 37.

The transfer disk 26, assembling unit 31, transfer disk 33 and spinning device 34 are rotatable each about its vertical axis and are rotated by an electric motor 38 operable through interconnected gearing as presently described to rotate the several devices in the directions indicated by the arrows. The individual spinning units 35 are also continuously rotated, each about its own vertical axis. The motor 38 and mechanism operated thereby are mounted on a machine base 40. The framework supporting the assembly mechanism 31 and the spinning mechanism 34 includes standards 41 (Fig. 3) to which is bolted a platform 42, said mechanisms being mounted directly on the platform. A driving belt 43 (Figs. 1 and 3) runs on the motor pulley and a driving pulley 44 on a horizontal shaft 45 journalled in hangers 46 bolted to the platform 42. A shaft 47 in line with the shaft 45 is connected thereto by a coupling 48. Hand wheels 49 are attached to the shafts 45 and 47.

The assembly device 31 includes a stationary center column 50 (Fig. 3 and 11) on which is mounted a rotary carriage 51 carrying the assembly units 32. The carriage is driven from the shaft 47 through a train of gearing including a pinion 52 keyed to the shaft and driving a bevelled gear 53 on a vertical shaft 54 carrying a spur pinion 55 which meshes with and drives a ring gear 56, secured to the carriage.

Figure 3:
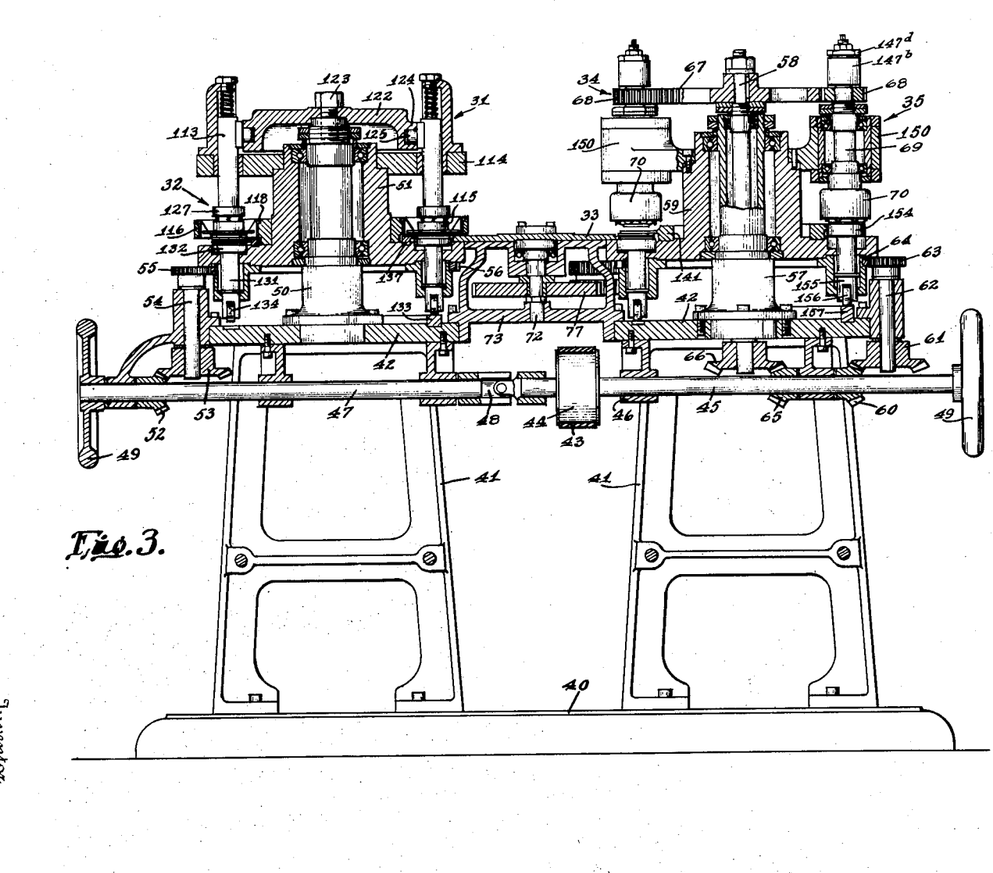
Fig. 3 is a sectional elevation at the line 3—3 on Fig. 1, on a somewhat larger scale.
Figure 15:
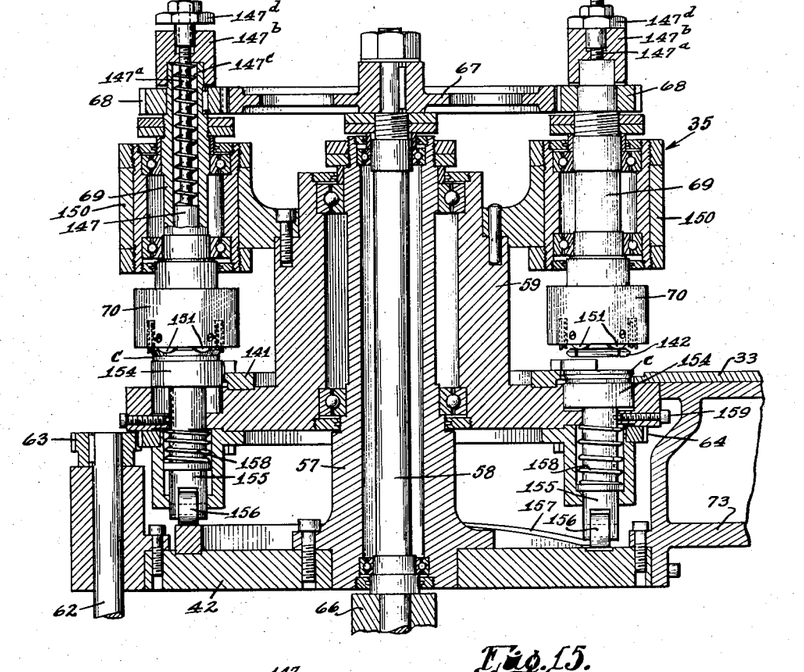
Fig. 15 is a sectional elevation of the spinning mechanism by which the marginal edges of the metal caps are spun over the ring gaskets and clenched thereto.

The spinning mechanism 34 includes a center column 57 bolted to the table 42 and having journalled therein a vertical spindle 58 (Figs. 3 and 15). Surrounding the column 57 and mounted for rotation thereon is a carriage 59 to which the spinning units 35 are attached for rotation therewith about the center column 57. The carriage 59 is driven from the shaft 45 through a train of gearing including intermeshing bevelled gears 60 and 61 keyed respectively to the shaft 45 and a vertical shaft 62. A spur gear 63 on the shaft 62 drives a ring gear 64 attached to the carriage 59 and thereby rotates the latter. The spindle 58 is driven from the shaft 45 by means of intermeshing spur gears 65 and 66 keyed to said shaft and spindle respectively. Keyed to the spindle 58 near the upper end thereof, is a gear wheel 67 which runs in mesh with spur gears 68 individual to the spinning units 35. Each said unit includes a vertical tubular shaft 69 carrying a spinning head 70. It will be noted that the gearing for rotating the carriage 59 of the spinning mechanism and for rotating the spindles 69 is so arranged and proportioned that the spindles are rotated about their own axes at a high speed as compared with their revolution about the axis of the spindle 58. The construction and operation of the spinning mechanism will be more fully described later.

Figure 23:
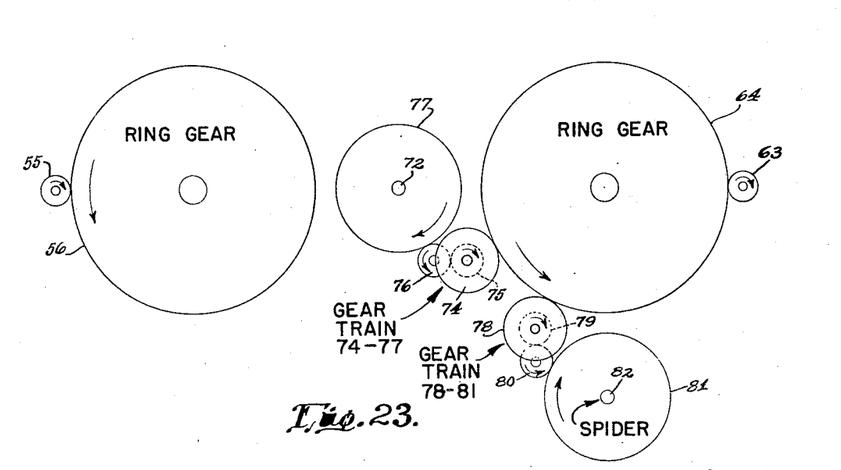
Fig. 23 is a diagrammatic view of trains of gearing through which motion is transmitted to various rotating parts of the machine.

The transfer disk 33 (Figs. 1 and 3) is carried on a vertical shaft 72 journalled in a casting 73 bolted to the platform 42. The disk 33 is rotated by the ring gear 64 (Figs. 3 and 23) operating through a train of gearing including gears 74, 75, 76 and 77, the gear 77 being keyed to the shaft 72. The transfer disk 26 is also driven from the ring gear 64 through a train of gearing including gears 78, 79, 80 and 81 (Fig. 23), the gear 81 being attached to a rotary spider 82 (Fig. 24) carrying the transfer arms 29. The gearing for driving the several parts including the assembling device 31, spinning device 34 and transfer disks 26 and 33, is so proportioned and arranged that all of said parts are rotated at the same angular speed.

Figure 4:
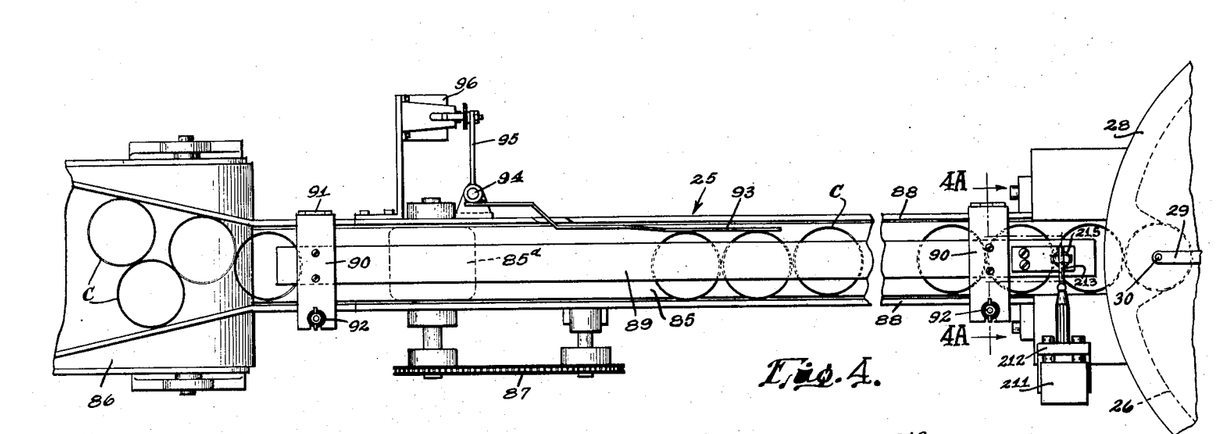
Fig. 4 is a plan view showing the conveying mechanism by which the caps are advanced to the assembling apparatus.

The conveyor 25 (Figs. 1, 4 and 4A), by which the caps C are fed to the transfer disk 26, comprises an endless belt 85 extending between a belt conveyor 86 and the transfer disk 26. The belt 85 may be driven by an electric motor 85a synchronized with the motor 38 and operating through a train of gearing including a sprocket chain 87 (Fig. 4). The framework of the conveyor includes side rails or frame members 88 positioned and spaced to maintain the caps in single file. A stationary guide plate 89 is positioned over the belt and extends lengthwise thereof, being spaced above the belt to accommodate the caps. The plate 89 is attached to straps 90 connected to the frame by hinges 91 and secured in position by bolts and wing nuts 92. The caps C, which are placed in inverted position on the conveyor 86, are converged to a single row as they move onto the conveyor 25, there being normally an unbroken row of the caps.

Figure 4A:
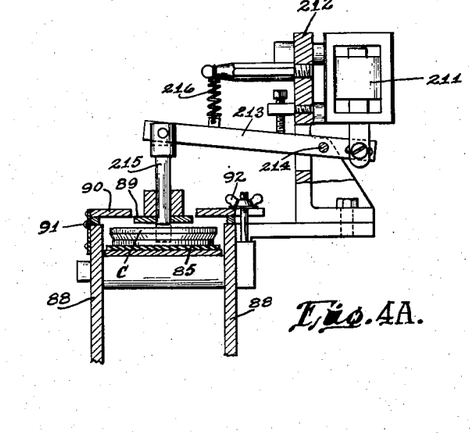
Fig. 4A is a sectional elevation at the line 4A—4A on Fig. 4, showing particularly a cap arresting device under the control of the gaskets and their feeding mechanism.

An automatic control device for stopping the machine whenever there is a break in the row of caps, includes a rock arm 93 extending along the conveyor and mounted to swing about a pivot 94. A second rock arm 95 connected to swing with the arm 93 is arranged to operate an electrical switch 96. The advancing caps C normally hold the arm 93 in the position shown. If there is a break in the line of caps the arm is permitted to swing inwardly and thereby actuate the switch 96 for stopping the motor as hereinafter set forth.

The conveyor 27 for the ring gaskets B comprises an endless chain trained over pulleys 97 and 98 (Figs. 1 and 25) and may receive its power through a belt 99 motor driven by or in synchronism with the motor 38. Referring to Figs. 5 to 10, the framework of the ring conveyor mechanism includes a pair of angle bars 100, extending lengthwise of the conveyor and spaced a short distance apart to provide a longitudinal slot 101 to accommodate a series of pegs 102 which are attached to the conveyor chain at regular intervals and extend downwardly through said slot during their travel toward the assembling machine. Each said peg is rigidly attached to a short cross bar 103 secured to the chain by angle straps 104. The cross bars 103 are supported during their forward travel on stationary angle bars 105 extending lengthwise of the conveyor. A rail 106 extending lengthwise over the lower strand of the conveyor chain prevents the chain and pegs 102 from being lifted above their operating position. The rail 106 is suspended by bolts 107 attached to yokes 108 positioned at intervals along the conveyor and bolted to the angle bars 100.

Figure 24:
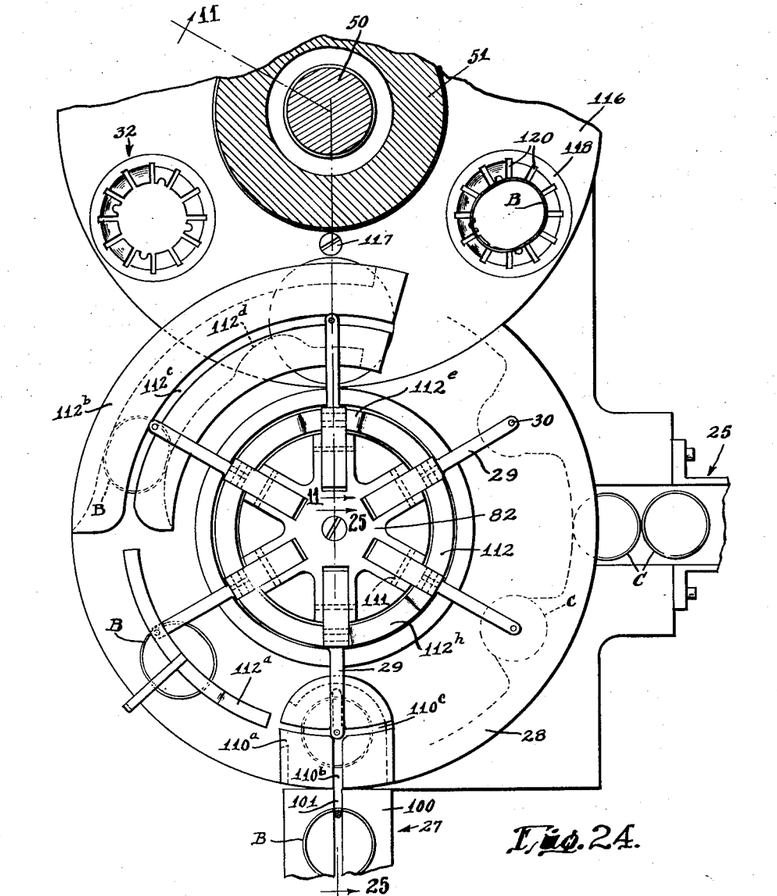
Fig. 24 is a part-sectional plan view showing particularly the means for receiving the caps and ring gaskets from the straight line conveyors and transferring them to the assembling mechanism.
Figure 25:
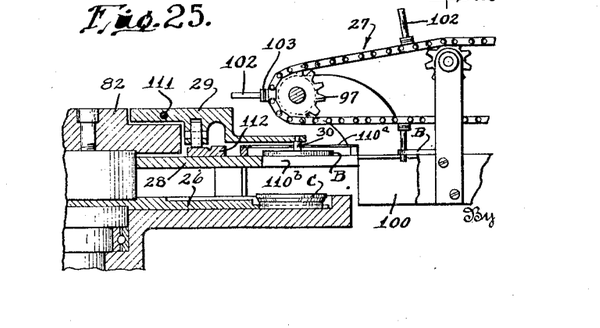
Fig. 25 is a section at the line 25—25 on Fig. 24.

The pegs 102 carry the ring gaskets forward to the platform 28, the rings being supplied to the pegs from a chute 110 or the like (Fig. 1), at the outer end of the conveyor. As the ring gaskets reach the transfer mechanism they are released from the pegs 102 and thus transferred to the platform 28. Referring to Figs. 24 and 25, it will be seen that the angle bars 100 abut the platform 28, the ring supporting surfaces of said bars and platform being in the same plane and thereby permitting the rings to slide onto the platform. A hood 110ª is mounted on the platform 28 in line with the bars 100, and serves to hold the rings temporarily in position to be picked up by the rotating arms 29. The hood and platform are slotted at 110ᵇ in line with the slot 101 to permit the passage of the pegs 102, the hood also being formed with a slot 110ᶜ for the passage of the lugs 30.

The ring, when placed on the transfer platform 28, is positioned over the path of the caps C held in the rotating transfer disk 26. The ring is carried forward along with an underlying disk by means of one of the arms 29. Each of the arms 29 is mounted to swing on a pivot pin 111 permitting the ring engaging peg 30 to be lifted and lowered, under the control of a cam 112. Immediately after a ring has been positioned beneath the hood 110ª, an arm 29 traverses the hood. A high section 112ʰ of the cam lifts the arm and its peg over the side of the hood and then permits the peg 30 to move down into the ring, so that the ring is caught by the peg 30 and carried forward along with the underlying cap to the assembly mechanism 31.

As the arm 29, carrying with it a ring B, leaves the hood 110ª, it passes beneath an arc-shaped guiding rail 112ª mounted over the platform 28 and thereby prevents the arm from accidentally jumping or swinging up and releasing the ring. Beyond the rail 112ª, an arc-shaped shield 112ᵇ is mounted over the platform and spaced thereabove to permit the passage of the rings beneath the shield. The arms 29 move along the upper surface of the shield while the pins 30 move along a slot 112ᶜ in the shield. When an arm 29 and the ring carried thereby are brought into position for releasing the ring to an assembly unit 32, the arm is permitted to drop a short distance by a dip section 112ᵉ of the cam 112 and then given a quick upward movement so that the peg 30 is disengaged from the ring. The inner guiding wall of the shield 112ᵇ is formed with a hump 112ᵈ for guiding the ring and positioning it preparatory to transferring it to the cap therebeneath.

Figure 11:
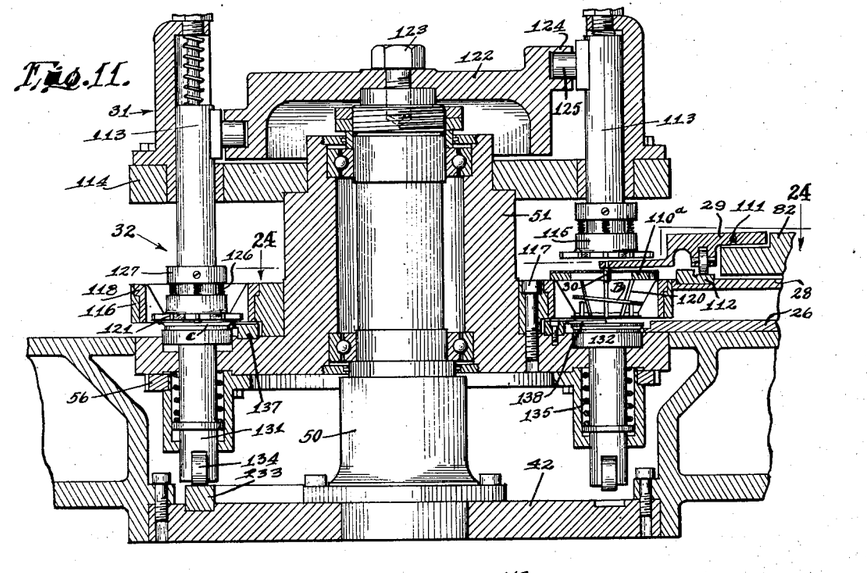
Fig. 11 is a sectional elevation of the assembling group shown at the left in Fig. 3, but on a larger scale, the section being at the line 11—11 on Fig. 24.
Figure 12:
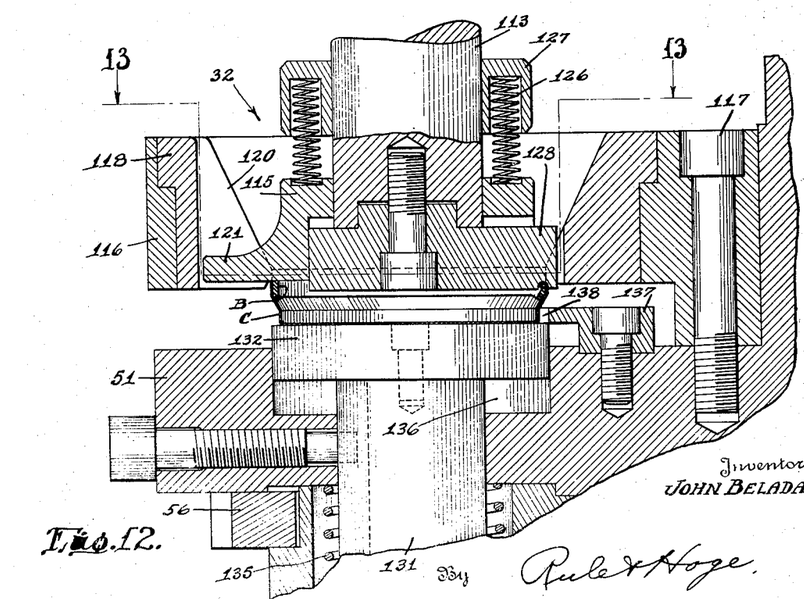
Fig. 12 is a fragmentary sectional view on a larger scale than that of Fig. 11 showing one of the assembling units.

Referring to Figs. 11 and 12, each assembly unit 32 comprises a vertical shaft 113 mounted for up-and-down movement in a bearing plate 114, the latter being mounted on the carriage 51. The shaft 113 has mounted thereon for up-and-down movement near the lower end of the shaft, a spider 115. An annular plate 116 mounted concentrically with the carriage 51 and secured thereto by bolts 117 (Figs. 11 and 12), is provided with circular openings therethrough individual to the assembly units, each said opening having mounted therein a bushing 118 having its inner walls tapered downwardly so that it serves as a funnel through which the ring gaskets are dropped as they are being transferred to the caps. Thus, as shown at the right in Fig. 11, a gasket B is dropping through the funnel 118 into a cap C therebeneath. The inner walls of the funnel are formed with slots 120 spaced to receive the radial ribs 121 formed on the spider 115.

The shafts 113 are moved up and down under the control of a cam 122 (Fig. 11) secured by a bolt 123 at the upper end of the column 50. The cam is formed with an annular cam track 124 on which run cam follower rolls 125 carried by the shafts 113. The cam track is designed to move each shaft 113 downward during its travel from the gasket receiving station to the transfer disk 33. This downward movement causes the spider 115 to force the ring gasket downwardly into the cap therebeneath. Coil compression springs 126 are interposed between the spider and a collar 127 keyed to the shaft 113, thereby providing a yielding pressure of the spider and also permitting an operation now to be described by which the rings are temporarily secured within the caps.

Figure 13:
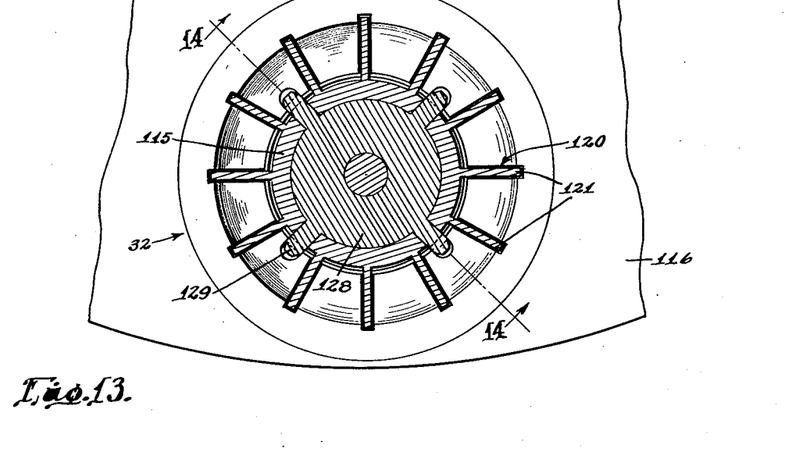
Fig. 13 is a section at the line 13—13 on Fig. 12.
Figure 14:
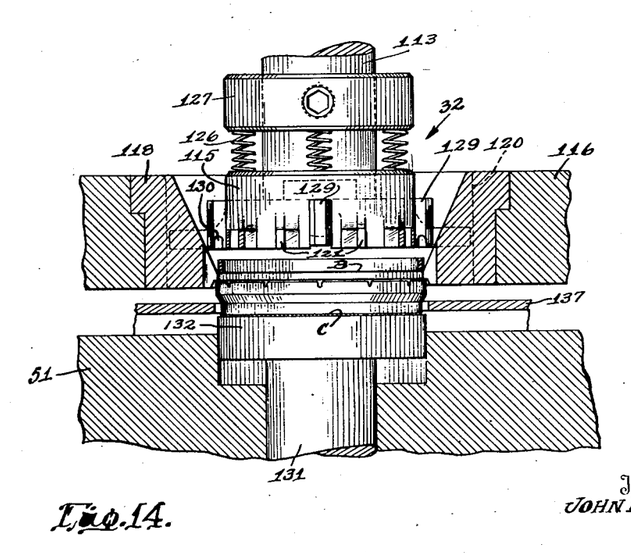
Fig. 14 is a part-sectional elevation of an assembling unit, the section being at the line 14—14 on Fig. 13.

Bolted to the lower end of the shaft 113 is a crimping die 128 formed with radial arms 129 (Figs. 13 and 14) extending through slots in the annular spider 115. Each arm 129 is formed in its lower face with a recess 130 in position to receive an upper marginal portion of the cap flange and the ring gasket therein and crimp or curl said margin of the cap inwardly at the point of contact and thereby grip the ring and hold it in position within the cap. The cap is thus secured at intervals along its periphery to the ring.

The mechanism for assembling the caps and rings also includes means for lifting the cap while the spider 115 is lowered. For this purpose, each unit comprises a stem 131 below and in line with the shaft 113, said stem having on its upper end a pad 132 in the form of a disk. During the assembling, the cap rests on the pad and is lifted thereby. The means for lifting the caps includes a cam track 133 on which run cam rolls 134 on the lower ends of the stems 131. Coil compression springs 135 hold the cam rolls on the track. The carriage 51 in which the stems 131 are mounted is formed with recesses 136 to receive the pads 132.

During the assembling of the caps and rings by the assembly mechanism 31, the caps are carried in their circular path of travel around the axis of the colume 50 by a carrier disk 137 (Figs. 2 and 11) bolted to the carriage and formed with pockets 138 for holding the caps. As shown in Fig. 2, the disk 137 is in overlapping relation to the transfer disks 33 and 26. As the disks rotate the pockets 138 are brought into register with pockets 138ª and 140 in the disks 26 and 33 to permit the transfer of the caps from one disk to another. As stationary shield 139 (Fig. 1) extends along the periphery of the disk 33 in position to retain the caps in the pockets 140 during the transfer from the assembling mechanism 31 to the spinning mechanism 34. The caps are transferred in like manner from the disk 26 to the carrier 137. From the transfer disk 33 the caps are transferred to the control of the disk or carrier 141 mounted on the carriage 59 and which may be substantially like the disk 137.

Figure 17:
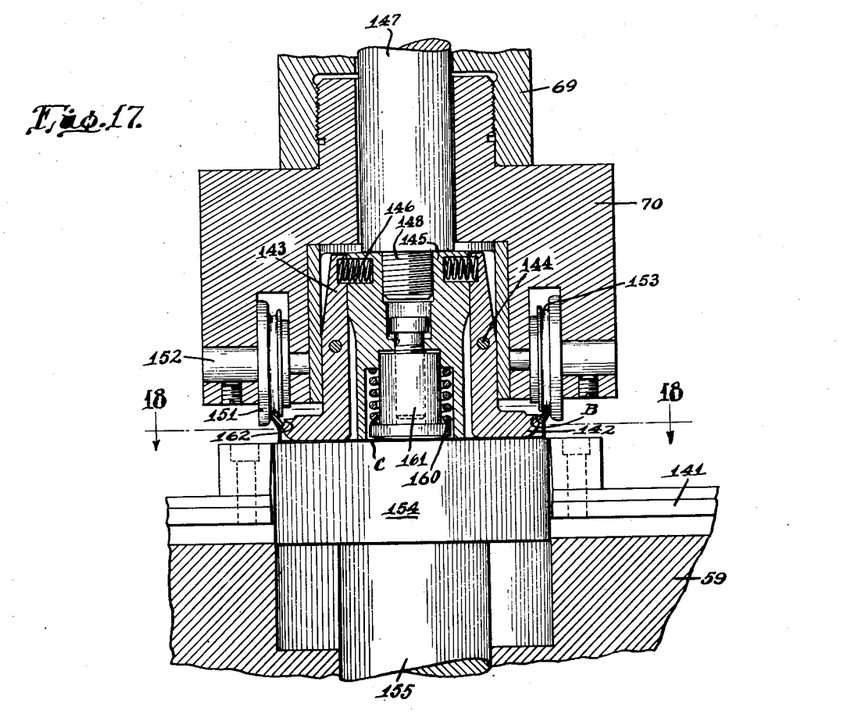
Fig. 17 is a view similar to Fig. 16, but on a larger scale and with the parts in a position assumed during the spinning operation.
Figure 18:
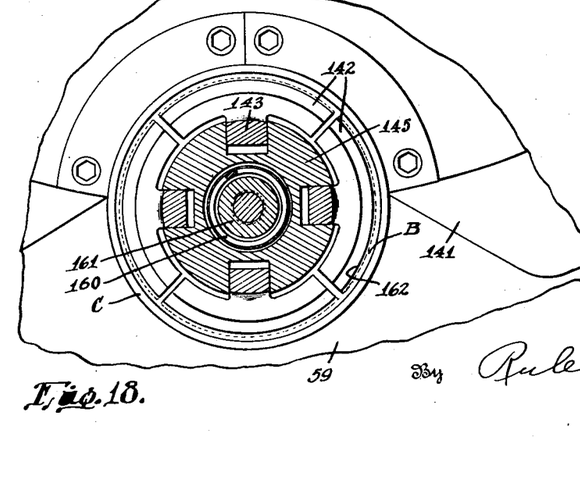
Fig. 18 is a section at the line 18—18 on Fig. 17.

As the caps are rotated with the carriage 59, the raw edges of the cap flanges are spun over the upper edges of the ring gaskets as shown in Fig. 17, for securely holding the gaskets in position.

Referring to Figs. 15 to 18, which illustrate the construction of the spinning heads 70, each head has mounted therein a collapsible and expansible pad for holding the assembled cap and gasket during the spinning operation. Each pad comprises four arc-shaped jaws 142, each jaw having an upwardly extending shank 143. The jaws swing radially on pivots 144 by which they are mounted on a central hub 145, the shanks 143 being housed in recesses formed in the hub. Coil compression springs 146 swing the jaws about their pivots to collapse the pad. The hub 145 is attached to the lower end of a shaft 147 by means of a screw-threaded stud 148 formed on the shaft, said shaft being mounted for vertical movement relative to the head 70.

The shafts 69 carrying the heads 70 are rotatably mounted in carriers 150 secured to the carriage 59. The spinning heads 70 are rotated about their axes as heretofore described. Each spinning head 70 has mounted therein an annular series of spinning rolls 151 mounted on stud shafts 152. Each roll is formed with a peripheral groove 153 in position to receive the raw edge of the cap flange and shaped to gradually spin the said edge inwardly into gripping engagement with the ring gasket as the spinning head rotates and the cap is gradually moved upward. The cap during the spinning operation is supported on a pad 154 on the upper end of a vertical stem 155 which is mounted for limited up-and-down movement relative to the carriage 59. A cam follower roll 156 on the stem 155 runs on a cam track 157 shaped to lift the pad, during the spinning operation, from its lowered position to a lifted position shown at the right and left respectively in Fig. 15. A coil compression spring 158 serves to lower the pad 154. Rotation of the pad about its vertical axis is prevented by a screw-threaded pin 159, the inner end of which engages a vertical slot in the stem 155.

Figure 16:
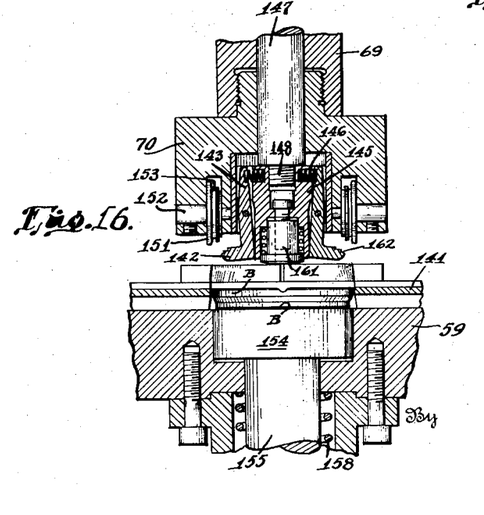
Fig. 16 is a fragmentary sectional view of one of the spinning units and the cap supporting means therebeneath.

Referring to Figs. 15 to 17, the expansible pad and its shaft 147, as before noted, are mounted for limited up-and-down movement relative to the spinning head 70. The shaft 147 has a reduced stem 147ª (Fig. 15) extending upwardly through the tubular shaft 69 and a head 147ᵇ secured to the upper end of the shaft 69. A coil spring 147ᶜ mounted on said stem, is held under compression between the head 147ᵇ and a shoulder on the shaft 147, thereby yieldingly holding the expansible pad in its lowered position relative to the spinning head. Such lowered position is adjustable by means of adjusting nut 147ᵈ. Mounted in a recess in the hub 145 of the expansible pad is a cap holder or clamping block 161 of cylindrical form adapted to contact a cap C supported on the pad 154 as the latter is lifted, thereby gripping and holding the cap in position during the spinning operation. The holder 161 has a limited vertical movement within the hub 145 and is held in its lowered position by a coil compression spring 160.

As the pad 154 with a cap thereon is lifted by its cam, the holder 161 engages the cap just before the latter contacts the expansible jaws 142 and then holds the cap while the jaws are expanded or swung outwardly by the upward pressure of the cap thereagainst, thus swinging the jaws to their expanded position (Fig. 17), in which recessed holding surfaces 162 formed in the jaws engage the lower margin of the ring gasket, thus holding the latter in position during the spinning operation. After the spinning operation is completed and the pad 154 moves downward, the shaft 147 and expansible pad carried thereby also move downward a short distance under the pressure of the coil spring 147ᶜ (Fig. 15), such movement being arrested by the stop nut 147ᵈ. The pad 154, as it continues its downward movement releases the jaws 142 which are then collapsed by the expansion of the springs 146, thus releasing the cap. At the same time, the coil spring 160 forces the holder 161 downwardly relative to the jaws 142, thereby assisting in freeing the cap.

The continued rotation of the cap carrier 141 after the spinning operation brings the cap to the discharging chute 36. A stationary stripper bar 165 (Figs. 19 and 21) serves as a positive means for stripping from the jaws 142, any cap which may not have been normally released before reaching the stripper bar. The free forward end of this bar is so positioned that any cap still adhered to the expansible jaws, passes under the bar and is guided in a downwardly and forwardly inclined direction, thereby stripping the cap from the holding jaws. The caps are guided into the downwardly inclined chute 36 and are carried therethrough to the conveyor 37.

Safety mechanism is provided for automatically stopping the machine, in the event of the stripping mechanism failing to strip a cap or if, for any cause, the machine is jammed by the caps on their way through the chute. Such mechanism will now be described.

Figures 19, 20, 21:
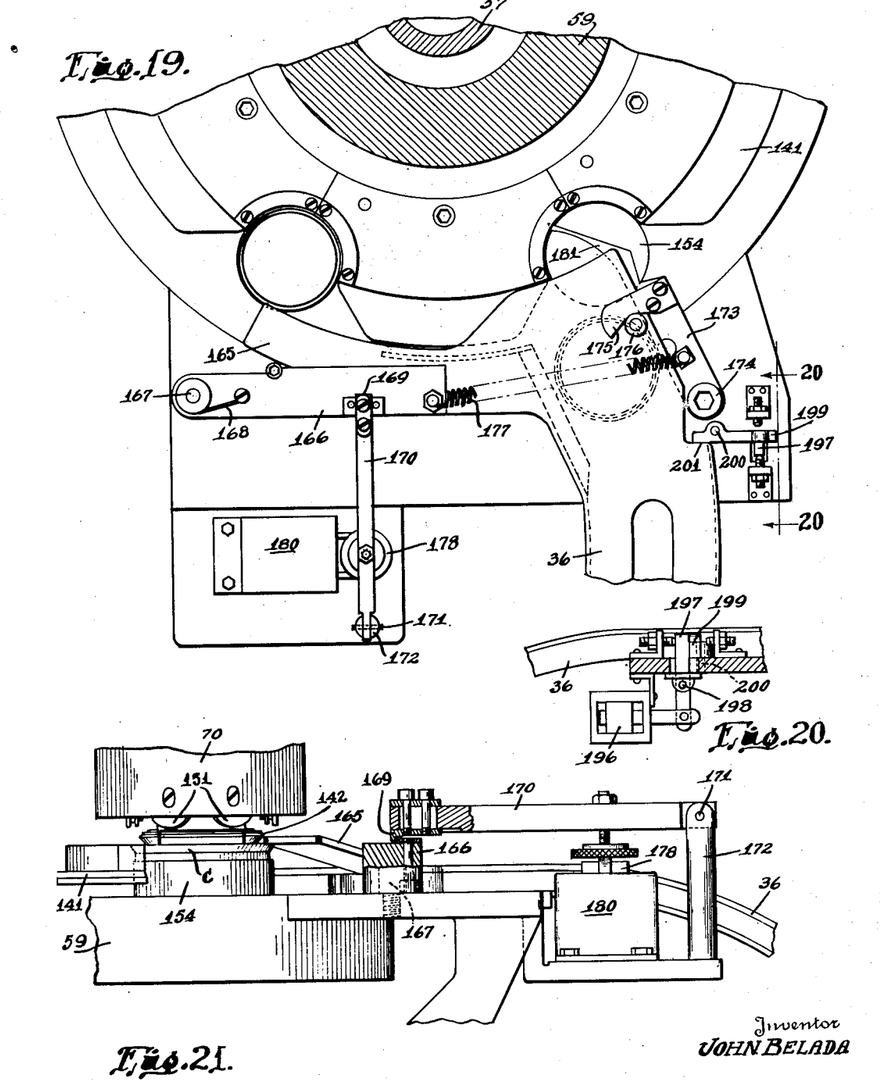
Fig. 19 is a fragmentary part-sectional plan view of means for discharging the cap assemblies from the spinning mechanism and including electrical control devices.
Fig. 20 is a section at the line 20—20 on Fig. 19.
Fig. 21 is a part-sectional elevation of mechanism shown in Fig. 19.

The stripper arm 165 is integral with or fixed to the chute 36. A bar 166 also fixed to the chute 36 is mounted on a pivot 167 so that the chute is connected to swing about said pivot. A leaf spring 168 applies tension to the arm 166 tending to swing it inwardly toward the spinning mechanism. Such movement is limited by a latch 169 in the form of a hook on one end of a horizontal arm 170 connected at its opposite end by a pivot 171 to a stationary post 172. A rock arm 173 is mounted to swing about a pivot 174 and carries a cam 175 which engages a roll 176 on the chute 36. The cam is held in its operative position by a coiled tension spring 177 connected to the arm 173.

The rock arm 170 has upward pressure applied thereto by a spring actuated device 178 (see Fig. 22) but is normally held against upward movement by the latch 169. When the free forward movement and discharge of the caps is interrupted in any way, as for example, by a cap sticking to the holding pad 142, an outward pressure is applied to the arm 165 thereby swinging said arm and the chute 36 about the pivot 167. A slight movement releases the latch 169 so that the arm 170 is released and swung upward about its pivot 171. This operates a control switch 180 and thereby stops the machine as hereinafter described. If a cap should fail to enter the chute 36 due to clogging of the chute or some other cause, it is brought into contact with a finger 181 on the rock arm 173 and thereby swings the latter so that the cam 175, bearing against the roll 176, swings the chute 36 about its fulcrum 167 and thus releases the arm 170, thereby effecting the operation of the switch 180.

The safety mechanism just described for stopping the machine is also operated when more than one ring gasket is carried on one of the pins 102 of the conveyor 27. The means by which such operation is effected will now be described, having reference to Figs. 8 to 10. Directly over the ring supporting surfaces 182 of the angle bars 100 is a pair of plates 183 spaced above said surfaces a sufficient distance to allow the free passage of the rings, such spacing of the plates being insufficient to provide clearance for two rings superposed on the same peg. The plates 183 have end portions 184 inclined to permit the free entrance of the rings B therebeneath. Bearings 185 are attached to said inclined end portions by which the plates are mounted to rock on pivots on the conveyor frame. A counterweight 187, carried by rock arms 188 extending from the bearings 185, counterbalances the plates 183. A micro-switch 190 mounted on a bar 191 on the conveyor frame, comprises a contact lug 192 which bears on a rock arm 193 pivoted at 194 and carrying at its free end a roll 195 which overlies one of the plates 183.

Figure 8:
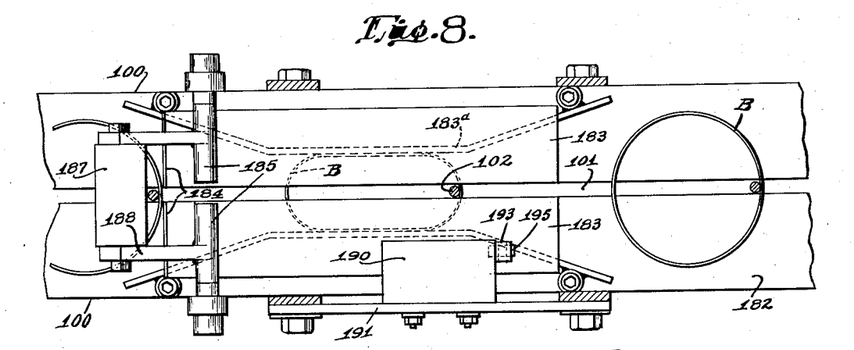
Fig. 8 is a fragmentary part-sectional plan view on a comparatively large scale of a portion of the liner conveying apparatus and electrical control mechanism operated by two or more liners carried on the same peg.
Figure 9:
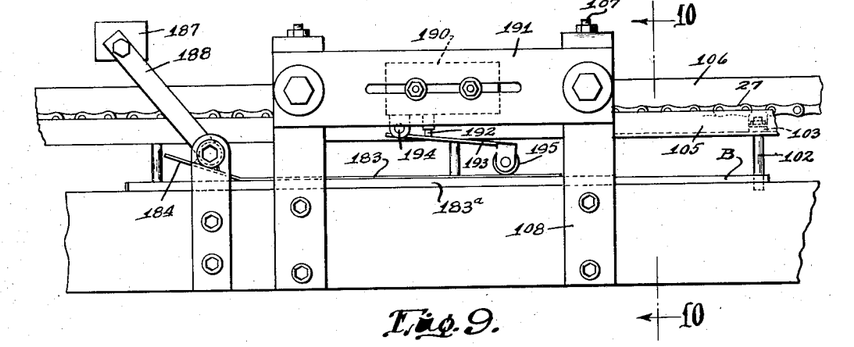
Fig. 9 is a side elevation of the apparatus shown in Fig. 8.
Figure 10:
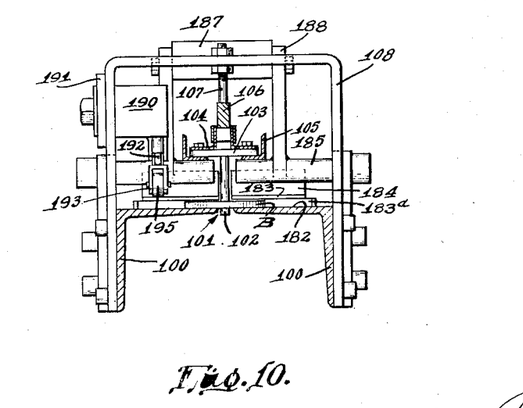
Fig. 10 is a cross-section at the line 10—10 on Fig. 9.
Figure 22:
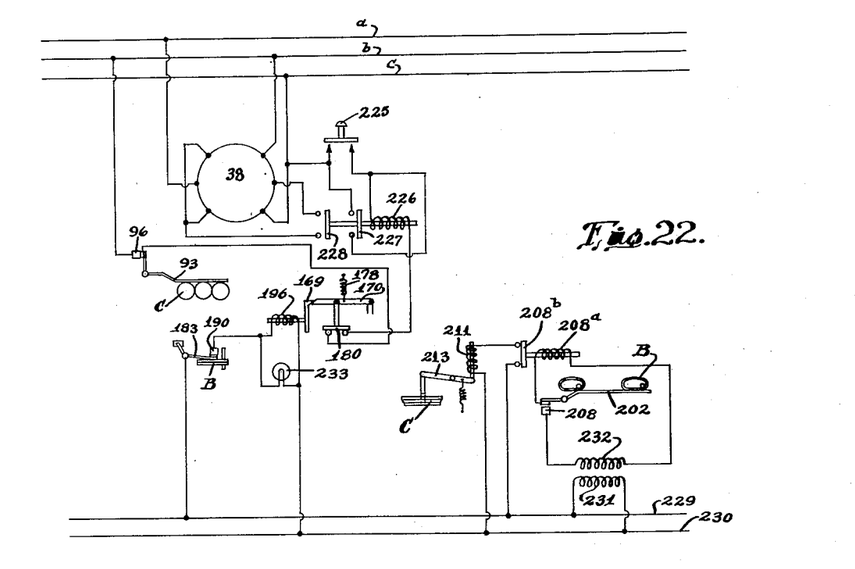
Fig. 22 is a wiring diagram of the electrical control devices.

As a ring B advances beneath the plates 183, it passes between stationary guiding rails 183ª and is thereby elongated as shown by broken lines in Fig. 8. If more than one ring is carried on a peg 102, they lift the plates 183 and thereby rock the arm 193 upwardly, thus lifting the contact lug 192 and closing the micro-switch 190. This establishes a circuit for the solenoid of an electromagnet 196 (Figs. 20 and 22). The magnet operates to swing a lever 197 mounted on a pivot pin 198 and projecting upwardly into position to engage a lever 199 (Fig. 19) and swing the latter about a pivot 200. The lever 199 contacts a shoulder 201 formed on the chute 36 so that said swinging of the lever moves the chute outwardly a short distance and thereby releases the latch 169. This effects the stoppage of the machine in the manner above referred to.

Figure 5:
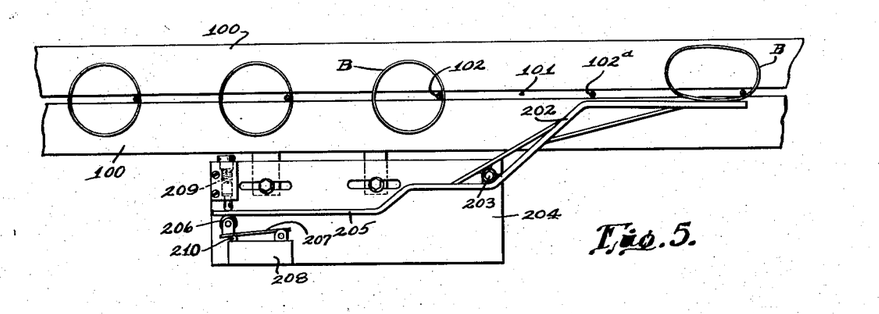
Fig. 5 is a part-sectional plan view of a portion of the conveying mechanism by which the ring gaskets or liners are advanced to the assembling mechanism and also showing an automatic electrical control device actuated by the gaskets for controlling the feed of the caps.
Figure 6:
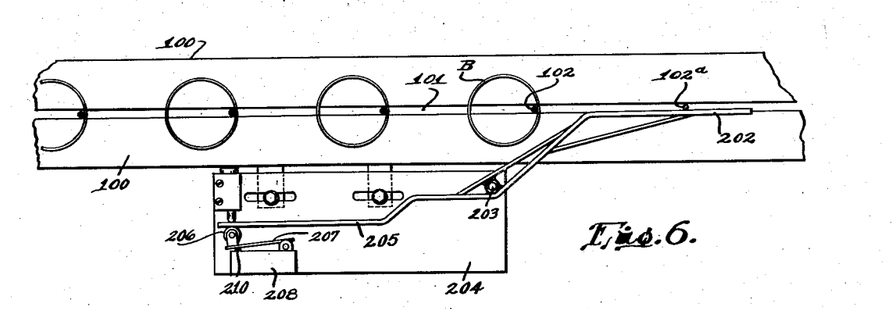
Fig. 6 is a view similar to Fig. 5 showing the operation of the electrical control device when a gasket is missing.
Figure 7:
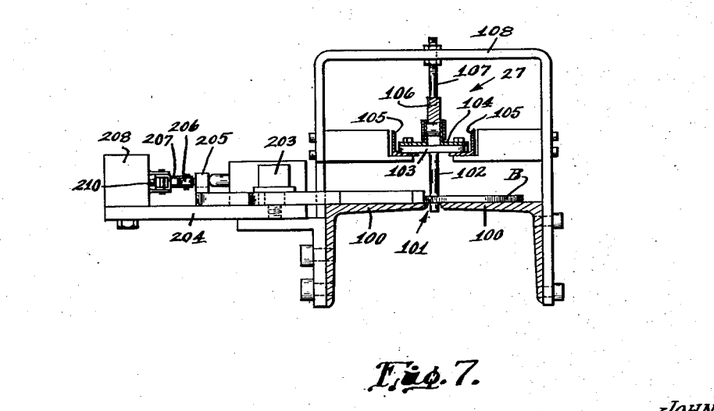
Fig. 7 is a cross-sectional elevation of the apparatus shown in Fig. 5.

If one of the ring carrying pins 102 is empty as shown at 102ª (Figs. 5 and 6), the forward movement of the caps C along the chute 25 is momentarily arrested in timed relation to the movement of said pin so that one of the cap carrying pockets in the transfer disk 26 is left empty, such pocket being the one to which a ring would normally be delivered from such pin. This prevents the spinning mechanism from operating on a cap in which there is no ring gasket and also prevents the machine from delivering caps without gaskets therein. The mechanism for effecting such operation is as follows:

Referring to Figs. 5 and 6, a lever comprising a rock arm 202 is fulcrumed on a pin 203 on a supporting plate 204, said arm extending along one side of the slot 101, in the path of the oncoming rings B. An arm 205 of the lever extends rearwardly into position to contact a roll 206 on a switch operating arm 207 of a micro-switch 208. Normally, the arm 202 is held a short distance away from the path of the pins 102 by the rings B. The arm 202 is of sufficient length to be engaged by each ring before the preceding ring has passed out of engagement. If a ring is missing, the arm 202 is swung inwardly into contact with the empty pin 102ª as shown in Fig. 6, under the influence of a compression coil spring 209 (Fig. 5), thereby depressing a contact lug 210 and closing the micro-switch 208.

The closing of the switch 208 establishes a circuit for a relay coil 208ª (Fig. 22) which then operates a contact bar 208ᵇ and closes a circuit for the solenoid of an electromagnet 211 (Figs. 4, 4A and 22). The electromagnet is mounted on a bracket 212 adjacent to the discharge end of the conveyor 25. The electromagnet core is connected to a lever 213 pivoted at 214 to the bracket 212 and carrying at its free end a stop rod or pin 215 positioned directly over the path of the caps C. The stop rod is normally held above the path of the caps by a coil spring 216. When the micro-switch 208 (Figs. 5 and 6) is actuated, owing to the empty pin 102ª, the circuit is established for the electromagnet 211 which then operates to lower the stop pin 215 to the dotted line position (Fig. 4A) and thus momentarily arrest the flow of the caps to the assembly mechanism. While the movement of the caps is thus interrupted, the ring conveyor continues its forward movement so that the switch operating arm 202 is again swung outwardly by the ring immediately behind the empty pin, thus opening the micro-switch 208 and de-energizing the electromagnet 211 so that the stop pin 215 is lifted and permits the flow of the caps to be resumed.

The operation of the various electrical control devices may be summarized as follows:

Referring to the wiring diagram (Fig. 22), the main motor 38 is connected to receive its current from the mains a, b, c, of a three phase system. The motor is started by depressing a push-button switch 225 which completes a circuit through a coil 226 of the motor switch, thereby moving the contact bars 227 and 228 to closed position. The contact bar 228 completes a circuit for the motor, which is thereby started. The contact bar 227 closes a by-pass across the push-button switch and completes a holding circuit through the coil 226 for maintaining the motor circuit independently of the push-button switch.

Certain of the electrical control devices are actuated by current supplied from a transformer having its primary 231 connected across the mains 229 and 230 of an alternating current circuit. The secondary winding 232 of the transformer is connected in circuit with the relay coil 208ª, said circuit, as before described, being normally held open at the switch 208 by the rings B. When a ring is missing from one of the pins it permits closing of the switch 208, thereby energizing the coil 208ª which then closes its switch and thereby completes a circuit for the electromagnet coil 211, said circuit being connected across the mains 229 and 230. The electromagnet, being energized, operates to arrest the flow of the caps C as long as any empty pins are passing the switch arm 202.

The electromagnet coil 196 is connected in circuit across the mains 229 and 230, said circuit including the switch 190 which is normally open but is closed when two rings, carried on the same pin, pass beneath the switch arm. This closing of the switch causes the electromagnet 196 to release the latch 169 and permit the spring 178 to open the switch 180. This de-magnetizes the motor switch coil 226 so that the switch is opened and stops the motor. Closing of the switch 190 also serves to light a lamp 233 connected in parallel with the electromagnet 196. The lamp 233 may be, for example, a red signal lamp located at any convenient place and indicates to the operator where the trouble is located. The switch 96 which is opened when the flow of caps C is interrupted, is in the same circuit with the switch 180 and also serves when opened, to stop the machine. As before noted, the switch 180, which, when opened, stops the main motor, is under the control both of the ring carrying conveyor and the cap discharging mechanism.

Modifications may be resorted to within the spirit and scope of my invention.

I claim:

1. Apparatus for assembling flanged caps and liner rings, comprising a carriage rotatable about an axis, means for continuously rotating the carriage, an annular series of assembling units mounted concentrically of said axis for continuous rotation with the carriage, each said unit comprising a plunger and an upwardly facing cap-supporting pad for supporting a cap in inverted position, said plunger being mounted for vertical reciprocation over said pad, means for reciprocating the plunger and thereby forcing a ring into position within the cap, and a crimping die connected to said plunger and comprising spaced radial arms formed with crimping surfaces positioned and shaped to engage the cap flange when the plunger is lowered and curl or crimp the flange into holding engagement with the ring in the cap.

2. Apparatus for assembling caps and liner rings, comprising a funnel having its inner wall downwardly tapered, a support on which the funnel is mounted, a cap-supporting pad mounted beneath the funnel, a plunger mounted over the funnel for vertical reciprocation, said plunger when in its upper position being spaced above the funnel to permit a liner ring to be advanced horizontally to a position between the said plunger and funnel and to be released to the funnel, means for lifting the pad and simultaneously moving the plunger downward through the funnel and thereby assembling the cap and liner ring, said funnel having vertical slots formed in the tapered wall thereof, said plunger having radially disposed ribs positioned and arranged to project into said slots and move up and down therein as the plunger is lifted and lowered, and a crimping die mounted for up-and-down movement with the said plunger and having a yielding connection therewith, said die having radial arms positioned at intervals circumferentially thereof, each said arm being formed on its lower face with a recess positioned and shaped to engage the cap flange for crimping the latter and causing it to grip the liner ring.

3. Apparatus for assembling caps and liner rings, comprising a funnel having its inner wall downwardly tapered, a support on which the funnel is mounted, a cap-supporting pad mounted beneath the funnel, a plunger mounted over the funnel for vertical reciprocation, said plunger when in its upper position being spaced above the funnel to permit a liner ring to be advanced horizontally to a position between the said plunger and funnel and released to the funnel, means for lifting the pad and simultaneously moving the plunger downward through the funnel and thereby assembling the liner ring and a cap supported on the pad, the walls of said funnel being formed with vertical guideways, said plunger having radial ribs extending into and movable up and down the said guideways, and a crimping die yieldably connected to the plunger for up-and-down movement therewith, said die comprising means for crimping the cap flange and causing it to grip the said liner ring.

JOHN BELADA.

REFERENCES CITED

The following references are of record in the file of this patent:

UNITED STATES PATENTS

| Number | Name | Date |
|---|---|---|
| 487,764 | Norton | Dec. 13, 1892 |
| 547,974 | Wagandt | Oct. 15, 1895 |
| 1,087,040 | Mrozinski et al. | Feb. 10, 1914 |
| 1,162,234 | Gray | Nov. 30, 1915 |
| 1,318,416 | Stabler et al. | Oct. 14, 1919 |
| 1,343,914 | Graham | June 22, 1920 |
| 1,363,542 | Thornburgh | Dec. 28, 1920 |
| 1,440,143 | Guenther | Dec. 26, 1922 |
| 1,690,002 | Fink | Oct. 30, 1928 |
| 1,776,227 | Wieland | Sept. 16, 1930 |
| 1,929,339 | Troyer et al. | Oct. 3, 1933 |
| 1,970,574 | Pelosi | Aug. 21, 1934 |
| 2,061,589 | Philp | Nov. 24, 1936 |
| 2,098,906 | White | Nov. 9, 1937 |
| 2,223,324 | Kosatka | Nov. 26, 1940 |
| 2,255,707 | Kronquest et al. | Sept. 9, 1941 |
| 2,363,248 | Hopkins | Nov. 21, 1944 |
| 2,370,969 | Kantor | Mar. 6, 1945 |
| 2,423,333 | Miller | July 1, 1947 |